Patented Oct. 31, 1939

2,178,474

UNITED STATES PATENT OFFICE 2,178,474

ALKYD RESIN PAINT

Friedrich Frick, Uerdingen, Germany, assignor to I. G. Farbenindustrie Aktiengesellschaft, Frankfort-on-the-Main, Germany No Drawing. Application December 5, 1929, Serial No. 411,987. In Germany December 12, 1928

8 Claims. (Cl. 260—6)

The invention relates to new paints and their use for producing colored surfaces on materials of various kinds. Particularly it concerns suspensions of inorganic and organic color pigments in an aqueous emulsion of a resinous body in the presence of a suitable emulsifying agent.

As I have found, stable suspensions of color pigments very well adapted for painting and printing on paper, leather, textile fabrics, wood, natural and artificial stones, cement, plaster, mortar, roofing felt and many other materials may be manufactured when a resinous body in aqueous suspension is used as medium. In order to obtain this emulsion in the necessary degree of fineness, uniformity and stability, an emulsifying agent is to be employed, preferably a salt of ammonia or a volatile amine with an organic acid of high molecular weight. Soft resinous bodies may be emulsified without the aid of an organic solvent, whereas hard ones are to be dissolved in a suitable solvent.

The resinous bodies of which I make use for producing the emulsions are artificial resins containing the radical of a polyvalent alcohol and the radicals of a polybasic and a monobasic carboxylic acid, known as mixed acid resins of the alkyd type, that is, the products obtainable from glycerol, glycol, polyglycols or polyglycerols, glycerol ethers, pentaerythrite, mannitol, sorbitol and the like, by simultaneous or successive esterification with a monobasic acid, such as linoleic acid, ricinoleic acid and its dehydration products, eleomargaric acid, and the like and a polybasic acid, such as phthalic acid, trimellitic acid, succinic acid, maleic acid, diglycollic acid or thiodiglycollic acid. Especially valuable are those synthetic resins of the class mentioned which contain an acid with more than one double bond and consequently have drying properties.

As emulsifying agents one may use the substances well known in the art, that is, alkali metal sulfonates of polyalkylated hydrocarbons, such as the salts of diisopropylnaphthalene sulfonic acid or dibutylnaphthalene sulfonic acid, salts of sulfonated tar oils or of sulfonated fatty acids, but I prefer the ammonium salts of high molecular aliphatic carboxylic acids, such as wax acids, montanic acid, rosin acids or the ammonium salts of alkali-soluble proteins such as, for instance, casein. The use of ammonia salts or salts of other easily volatile bases has the advantage that after painting the volatile base gradually evaporates and the acid is set free, whereby the resistance of the paint against water is improved.

The new paints are manufactured by combining the aqueous solution of the emulsifying agent with the resinous product in a suitable mixing apparatus and then incorporating the color pigment in the emulsion in the way usual in preparing other paints. By a following dilution with water I can vary the consistency within wide limits without deteriorating the stability of the suspension.

The paints can be applied to the ground by brushing, spraying or printing. The paints prepared according to the invention are of particular value for producing colored surfaces of great durability upon porous materials which possess the faculty of absorbing water, such as paper, wood, plaster, mortar and the like. The constituents of the emulsion penetrate deeply into the pores of the ground and form after the evaporation of the the water and the volatile base a tight union between the color film on the surface and the ground. If the above mentioned resins which possess drying properties are used, the paints will dry quickly; their resistance against abrasion, weathering and other corroding influences is excellent. On surfaces coated with paints containing a saponified wax as emulsifying agent I can produce a dull lustre by polishing with a brush.

With a special advantage the new paints are applied in the manufacture of waterproof wallpapers. It becomes possible to print by rollers several designs in rapid succession without the colors flowing into each other. The wallpapers produced with the new paints may lie in water for several weeks or be brushed with warm soap lye without being damaged.

My invention is illustrated by the following examples, but not restricted thereto.

Example 1

A paint is produced by emulsifying 100 parts of a soft artificial resin prepared by the condensation of 368 parts of glycerol with 834 parts of linoleic acid and 518 parts of phthalic anhydride, with 200 parts of water by aid of 1–2 parts of an emulsifying agent, such as the ammonium salt of diisopropylnaphthalene sulfonic acid. Furthermore 100 parts of bleached montan wax are saponified with 200 parts of water and 4 parts of ammonia and mixed with the aqueous emulsion of the resinous body, and finally 150 parts of red iron oxide are incorporated in the aforesaid suspension, by mixing the moistened pigment with the suspension by stirring, or by grinding the moistened pigment with the suspension in a paint mill. The consistency of this paint can be varied within wide limits by dilution with water without deteriorating the stability of the suspension so that it is possible to apply it to the ground by brushing, spraying and printing.

Example 2

200 parts of a soft resinous product obtained by the esterification of 276 parts of glycerol with 894 parts of ricinoleic acid and 370 parts of phthalic anhydride, are emulsified with 200 parts of water and 1-2 parts of the ammonium salt of dibutylnaphthalene sulfonic acid and mixed as described in the foregoing example with the ammonium salt of 100 parts of montan wax saponified with 200 parts of water and 4 parts of ammonia. Then 200 parts of white titanium oxide are combined with this ointment-like product, by mixing the moistened pigment with the product by stirring, or by grinding the moistened pigment with the product in a paint mill. Dilution with water is necessary to render the paint ready for use.

Example 3

100 parts of a soft artificial product resulting from the reaction between 92 parts of glycerol, 120 parts of phthalic anhydride and 280 parts of eleomargaric acid with admixture of a small amount of the lead and manganese salt of a fatty acid with high molecular weight are emulsified with 120 parts of an aqueous solution containing 2 parts of casein and 0.1 part of ammonia and then combined with 100 parts of chromium oxide, by mixing the moistened pigment with the suspension by stirring, or by grinding the moistened pigment with the suspension in a paint mill.

Example 4

100 parts of a hard condensation product made by the chemical combination of 276 parts of glycerol, 278 parts of linoleic acid and 518 parts of phthalic anhydride are dissolved in a mixture of 90 parts of toluene and 10 parts of alcohol and united with 300 parts of an emulsion consisting of 50 parts of shellac wax saponified in 240 parts of water and 10 parts of ammonia. By incorporating 100 parts of yellow iron hydroxide in this suspension a paint is prepared which is diluted with water for use.

Example 5

An emulsion as described in Example 1 is combined with 100 parts of a mixture containing 20 parts of azo dye pigment made of diazotized 2-naphthylamine-1-sulfonic acid and β-naphthol (lithol red) and 80 parts of chalk.

I claim:

1. As a new composition of matter a paint comprising a color pigment finely divided in an aqueous emulsion of a synthetic resin containing the radicals of a polyhydric alcohol, a polybasic acid, and an unsaturated fatty acid of the drying type, and an emulsifying agent.

2. As a new composition of matter a pain comprising a color pigment finely divided in an aqueous emulsion of a synthetic resin containing the radicals of glycerol, phthalic acid and linoleic acid, and an emulsifying agent.

3. As a new composition of matter a paint comprising a color pigment finely divided in an aqueous emulsion of a synthetic resin containing the radicals of glycerol, phthalic acid and linoleic acid and the saponification product of bleached montan wax with ammonia.

4. As a new composition of matter a paint comprising a color pigment finely divided in an aqueous emulsion of a synthetic resin containing the radicals of glycerol, phthalic acid and linoleic acid and an ammonium salt of casein.

5. A paint composition comprising a color pigment suspended in an aqueous emulsion of a condensation product of a polyhydric alcohol, a polybasic acid and an unsaturated fatty acid selected from the group consisting of linoleic acid, eleomargaric acid and the dehydration product of ricinoleic acid.

6. A paint composition comprising a color pigment suspended in an aqueous emulsion of a condensation product of a polyhydric alcohol, a polybasic acid and an unsaturated fatty acid of an oil selected from the group consisting of linseed oil and China-wood oil.

7. A paint composition comprising a color pigment suspended in an aqueous emulsion of a condensation product of glycerol, phthalic acid and an unsaturated fatty acid selected from the group consisting of linoleic acid, eleomargaric acid and the dehydration product of ricinoleic acid.

8. A paint composition comprising a color pigment suspended in an aqueous emulsion of a condensation product of glycerol, phthalic acid and and unsaturated fatty acid of an oil selected from the group consisting of linseed oil and China-wood oil.

FRIEDRICH FRICK.